(12) United States Patent
Katzer et al.

(10) Patent No.: US 7,841,513 B1
(45) Date of Patent: Nov. 30, 2010

(54) RADIO FREQUENCY IDENTIFICATION AUTHENTICATION OF MEMORABILIA

(75) Inventors: Robin Dale Katzer, Olathe, KS (US); Sunil K. Ponnangath, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 172 days.

(21) Appl. No.: 11/834,405

(22) Filed: Aug. 6, 2007

(51) Int. Cl.
*G06F 17/00* (2006.01)
(52) U.S. Cl. ............... 235/375; 340/5.8; 340/572.1
(58) Field of Classification Search ........... 235/375
See application file for complete search history.

(56) References Cited

U.S. PATENT DOCUMENTS

| | | | |
|---|---|---|---|
| 6,250,549 B1 * | 6/2001 | DeFabio, Jr. | 235/380 |
| 6,591,252 B1 * | 7/2003 | Young | 705/67 |
| 6,691,916 B2 * | 2/2004 | Noyes | 235/382 |
| 7,027,623 B2 * | 4/2006 | McWilliam et al. | 382/119 |
| 7,046,828 B1 * | 5/2006 | Gibbs et al. | 382/119 |
| 2001/0041214 A1 * | 11/2001 | Brogger et al. | 427/8 |
| 2002/0178363 A1 * | 11/2002 | Ambrogio et al. | 713/176 |
| 2003/0046543 A1 * | 3/2003 | Houston et al. | 713/176 |
| 2003/0191694 A1 * | 10/2003 | Vonfeldt et al. | 705/26 |
| 2004/0140349 A1 * | 7/2004 | Shaw | 235/375 |
| 2005/0289061 A1 * | 12/2005 | Kulakowski et al. | 705/50 |
| 2006/0180647 A1 * | 8/2006 | Hansen | 235/375 |
| 2007/0155510 A1 * | 7/2007 | Galvin et al. | 463/43 |
| 2007/0273518 A1 * | 11/2007 | Lupoli et al. | 340/572.1 |
| 2008/0078826 A1 * | 4/2008 | Siebers et al. | 235/375 |

\* cited by examiner

*Primary Examiner*—Michael G Lee
*Assistant Examiner*—Keith Goodman, Jr.

(57) ABSTRACT

A system is provided for radio frequency identification authentication of memorabilia. The system includes a database, a radio frequency identification tag having a unique identifier, a reader, and a user interface. The radio frequency identification tag is provided to a memorabilia item. The reader is configured to read the radio frequency tag and to determine a geographic location where the reader reads the radio frequency identification tag. The user interface is configured to enter information associated with the memorabilia item into the database, wherein the information comprises the unique identifier, a name of an authenticator, a description of the memorabilia item, and a time of authentication.

20 Claims, 5 Drawing Sheets

FIG. 2

| Database 202 | | |
|---|---|---|
| Authenticators 204 | Descriptions 206 | Unique Identifiers for Memorabilia Item 208 | Authentication Times 210 |
| Quarterback | 02/04/07 game football | | |
| Quarterback | 02/04/07 game helmet | | |
| Running Back | 02/04/07 game jersey | | |
| Receiver | 02/04/07 game photo | | |
| Kicker | 02/04/07 game tee | | |

FIG. 3

| Graphic User Interface 302 | | | | | |
|---|---|---|---|---|---|
| Authenticator 304 | Description 306 | Unique Identifier for Memorabilia Item 308 | Authentication Time 310 | | |
| Quarterback | 02/04/07 game football | 987654321 | 02/04/07 | | |
| Previous Sellers 312 | Previous Buyers 314 | Sale Times 316 | Sale Locations 318 | Sale Prices 320 | |
| First Seller | First Buyer | 02/04/07 | Miami, Florida | $50,000 | |
| Second Seller | Second Buyer | 04/01/07 | Dallas, Texas | $100,000 | |

View Video of Authentication 322

RADIO FREQUENCY IDENTIFICATION AUTHENTICATION OF MEMORABILIA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Memorabilia are objects that are treasured for their memories and valued for connections to historical events, culture, or entertainment. Such memorabilia items include sports equipment, garments, photographs, trading cards, programs, posters, brochures, media clippings, buttons, pennants, stickers, certificates, documents, souvenirs, musical instruments, autographs, letters, journals, diaries, entertainment-related merchandise, movie memorabilia, and other, often-licensed, sold or exchanged items. As memorabilia sales and auctions grew into extensive businesses, authentication services developed to address memorabilia collectors' concerns about purchasing counterfeit memorabilia items. Some authentication services send witnesses to authentication events, such as a gathering for professional athletes to autograph sports equipment they used during sporting events. The witnesses can issue certificates of authenticity, mark the memorabilia items with invisible ink, and place special stickers on memorabilia items. However, unscrupulous memorabilia dealers can duplicate the certificates, markings, and stickers, thereby flooding the market with counterfeit items. Memorabilia collectors may lose significant amounts of their investments by inadvertently purchasing counterfeit items and by having the value of their authentic items decline due to general market uncertainty over authenticity.

SUMMARY

In some embodiments, a system is provided for radio frequency identification authentication of memorabilia. The system includes a database, a radio frequency identification tag having a unique identifier, a reader, and a user interface. The radio frequency identification tag is provided to a memorabilia item. The reader is configured to read the radio frequency tag and to determine a geographic location where the reader reads the radio frequency identification tag. The user interface is configured to enter information associated with the memorabilia item into the database, wherein the information comprises the unique identifier, a name of an authenticator, a description of the memorabilia item, and a time of authentication.

In other embodiments, a method is provided for radio frequency identification authentication of memorabilia. A radio frequency identification tag having a unique identifier is provided to a memorabilia item. Information associated with the memorabilia item is displayed, wherein the information comprises the unique identifier for the memorabilia item, a name for an authenticator, a description of the memorabilia item, a time of authentication, and information related to any previous sales. Information related to a sale for the memorabilia item is entered into a database.

In still other embodiments, a method is provided for radio frequency identification authentication of memorabilia. A radio frequency identification tag having a unique identifier is provided to a memorabilia item. Another radio frequency identification tag having another unique identifier is provided to an authenticator. Information associated with the memorabilia item is entered into a database, wherein the information comprises the unique identifier for the memorabilia item, the other unique identifier for the authenticator, a description of the memorabilia item, and a time of authentication.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 shows a block diagram of a database for radio frequency identification authentication of memorabilia according to some embodiments of the present disclosure.

FIG. 3 shows a block diagram of a graphic user interface for radio frequency identification authentication of memorabilia according to some embodiments of the present disclosure.

DETAILED DESCRIPTION

Figure 1:
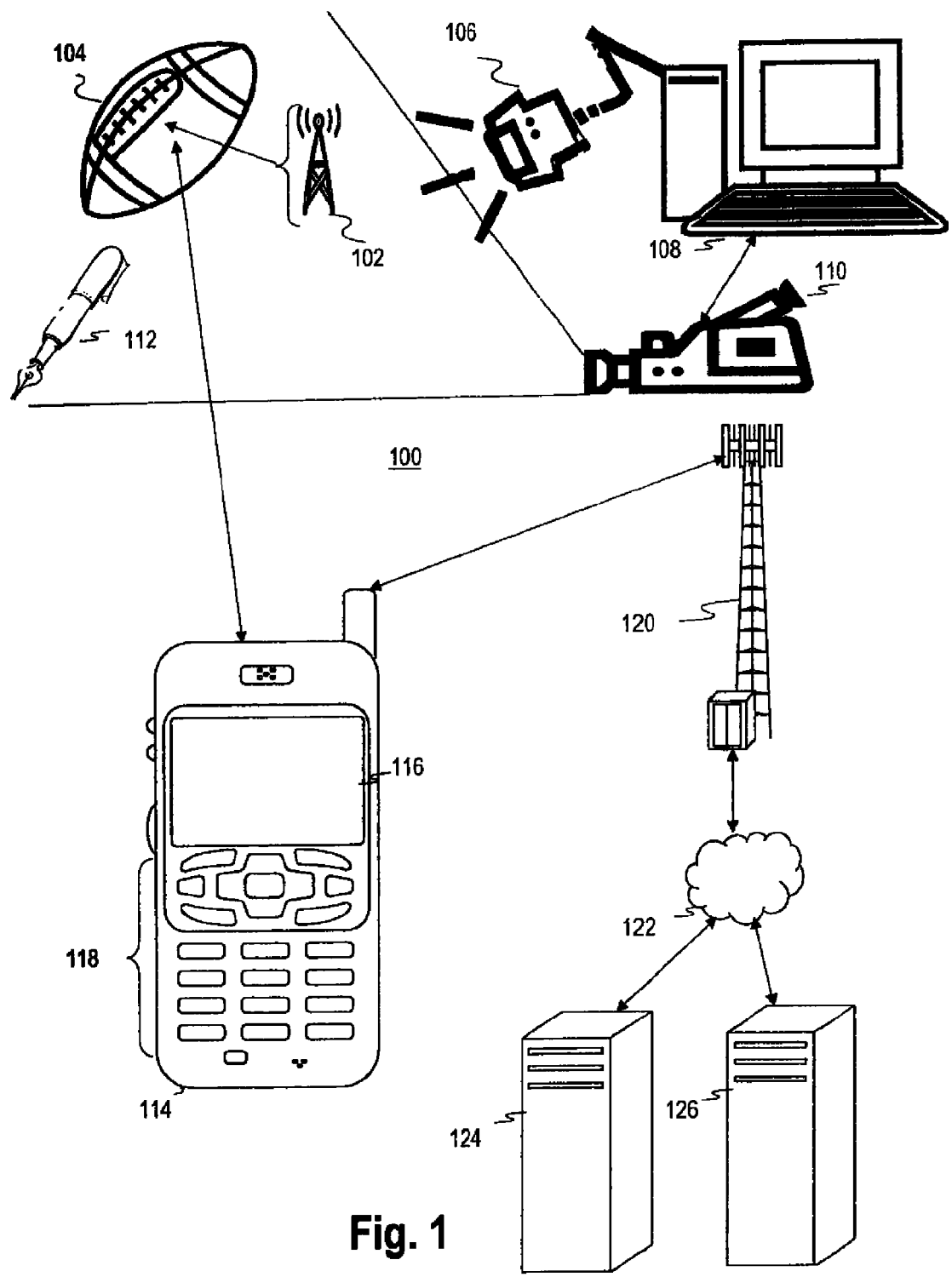
FIG. 1 shows an illustrative wireless communications system for radio frequency identification authentication of memorabilia.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, methods and systems are provided for radio frequency identification authentication of memorabilia. Systems include a database, a user interface, and a radio frequency identification tag having a unique identifier. A radio frequency identification (RFID) tag is an object that can be attached to or incorporated into a product, animal, or person for the purpose of identification using radio waves. RFID tags typically contain at least two parts. The first part is an integrated circuit for storing and processing information, modulating and demodulating a radio frequency (RF) signal and perhaps other specialized functions. The second part is an antenna for receiving and transmitting the signal. The RFID tag can automatically be read from several meters away and does not have to be in the line of sight of a RFID reader. RFID tags are used in supply chain management for large enterprises, increasing the speed and accuracy with which inventory can be tracked and managed, thereby saving money for the enterprises.

The RFID tag having a unique identifier is provided to a memorabilia item, thereby enabling memorabilia collectors to accurately identify and purchase memorabilia items without the concerns caused by counterfeit certificates, stickers, or markings. The user interface can be used to enter information associated with the memorabilia item into the database, such as the description of the memorabilia item, the unique identifier, the name of the person that authenticated the item, when, and where the item was authenticated. If the memorabilia item is identified in advance, the information associated with the memorabilia item can be loaded to the database before the event. Officials at the event can use the pre-loaded database to re-identify the memorabilia item before it is authenticated, and add any additional information to the database, such as how the memorabilia item was verified and the time the memorabilia item is authenticated. Collectors can also use the user interface to display information about memorabilia items. Dealers and law enforcement officials can identify an item by using a special RFID reader to read the unique identifier for the RFID tag, or a collector can use a mobile phone that uses the special reader. Memorabilia items can be uniquely identified by their RFID tags because each RFID tag has a unique identifier that is encrypted, such that the unique identifier can only be read by the special RFID readers. Using the unique identifier read from the memorabilia item, collectors can access the database to display the information associated with the memorabilia item.

In other embodiments, the information about memorabilia items includes information related to any previous sales of the memorabilia item. Information about subsequent sales can be entered into a database, including information about the seller, the buyer, the sales location and date, and the sales price. On-line auctions can access and display the information for previous sales. Sellers and buyers may use embodiments of the present disclosure to sell memorabilia items and transfer ownership of memorabilia items.

In still other embodiments, an additional RFID tag having another unique identifier is provided to an authenticator, such as a pen with another RIFD tag or an identification card with yet another RFID tag given to a professional athlete or a television celebrity. The reader at an authentication event can read both the unique identifier for the RFID tag provided to the memorabilia item and the unique identifier for the RFID tag provided to the professional athlete, and transmit both identifiers to the database. Memorabilia collectors can subsequently access the database to view the identifier for the memorabilia item and the identifier for the professional athlete who authenticated the memorabilia item, thereby providing another authentication safeguard for memorabilia collectors.

FIG. 1 shows a wireless communications system 100 that illustrates the context for the present disclosure's systems and methods. The system 100 includes a RFID tag 102 with a unique identifier. The tag 102 is provided to a memorabilia item 104, such as a football used in a championship game. The tag 102 can be used to uniquely identify the item 104 because the tag 102 has a unique identifier. The tag 102 is depicted as external to the item 104 and relatively large compared to the item 104 for illustration purposes only, as the tag 102 can be only millimeters wide and long, and embedded in or attached to the item 104 such that the tag 102 cannot be seen. A reader 106 can read the unique identifier for the tag 102 and can communicate the unique identifier to a computer 108 that has a user interface. Because the unique identifier for the tag 102 is encrypted, only the reader 106 can read the unique identifier. The reader 106 can electronically communicate the unique identifier to the computer 108, or a user can enter the unique identifier read by the reader 106 to the computer 108 via the user interface. The communication between the reader 106 and the computer 108 can be by wired means, as depicted in FIG. 1, or by wireless means. A camera 110 can record the authentication of the item 104 and can electronically communicate the record of the authentication to the computer 108 by wireless means, as depicted in FIG. 1, or by wired means. An authentication can be an act by an authenticator signifying the authentication of the item 104, such as a football player signing a football he used in a championship game. An autographing instrument 112, such as a pen, can include another RFID tag that can be used to authenticate the item 104.

The system 100 can include an illustrative mobile device 114. Though illustrated as a mobile phone, the mobile device 114 may take various forms including a personal digital assistant (PDA), a mobile computer, a digital camera, and a digital music player. Many suitable mobile devices 114 combine some or all of these functions. Although illustrated separately, the mobile device 114 can include the reader 106 and can communicate with the computer 108.

The mobile device 114 includes a display 116 and a touch-sensitive surface or keys 118 with which the user can interact. The mobile device 114 may present options for the user to select, controls for the user to actuate, and/or cursors or other indicators for the user to direct. The mobile device 114 may further accept data entry from the user, including numbers to dial or various parameter values for configuring the operation of the mobile device 114. The mobile device 114 may further execute one or more software or firmware applications in response to user commands. These applications may configure the mobile device 114 to perform various customized functions in response to user interaction, such as identifying the item 104.

In the illustrative system 100, the mobile device 114 communicates through a cell tower 120 and a wired or wireless network 122 to access information on various servers, such as a communication server 124 and a content server 126. While one cell tower 120 is shown in FIG. 1, other cell towers 120 could be present. The mobile device 114 may also communicate through a wireless access point or some other wireless communication. The content server 126 may provide content that may be shown on the display 116. For example, the content server 126 can provide information from a memorabilia auction website to the display 116. The content server 126 can include a database for memorabilia items and for sales of memorabilia items.

FIG. 2 is a block diagram of a database 202 for RFID authentication of memorabilia according to some embodiments of the present disclosure. The database 202 includes an authenticators 204 column, a descriptions 206 column, a unique identifiers for memorabilia items 208 column, and an authentication times 210 column. The cells in each row from the database 202 are associated with the other cells in the same row. In preparation for an authentication event, the database 202 can be pre-loaded with a list of authenticators and a list of descriptions for memorabilia items. For example, prior to a signing event when professional football players will autograph football equipment, the database 202 is preloaded with a list of the football players and a list of football equipment descriptions. In this example, the authenticators 204 column lists the names of the quarterback, the running back, the receiver, and the kicker who will sign the football equipment, or memorabilia items. The descriptions 206 column lists the football equipment, or memorabilia items, such as a football, a helmet, a jersey, and a tee that were used in the championship game, along with a photograph of the receiver playing in the championship game. The descriptions 206 column may list additional identifying information for the memorabilia items, such as the dimensions of the photograph or the make and model of the helmet. The unique identifiers for memorabilia items 208 column is empty in this example because the RFID tags having unique identifiers have not yet been provided to each of the memorabilia items. In another example, the tag 102 may be associated with the item 104 in preparation for the authentication event. For this example, the reader 106 reads the tag 102 at the authentication event to identify the item 104, which displays the cells for the item 104 from the database 202. The authentication times 210 column is also empty in this example because the football players have not yet authenticated the memorabilia items. The database 202 can also include columns listing the location, date, and time of the authentication event, and columns for sales information.

FIG. 3 shows a block diagram of a graphic user interface 302 for RFID authentication of memorabilia according to some embodiments of the present disclosure. The graphic user interface 302 can display authentication information in an authenticator 304 field, a description 306 field, a unique identifier for a memorabilia item 308 field, and an authentication time 310 field. Each of the fields 304-310 that display the authentication information are associated with the other fields 304-310 that display the authentication information. The graphic user interface 302 can also enter and display sales information for a previous sellers 312 column, a previous buyers 314 column, a sale times 316 column, a sale locations 318 column, and a sale prices 320 column. The cells in each row that display the sales information are associated with the other cells in the same row. A collector that is a potential buyer for the item 104 can enter access enabling information into the computer 108 to access a website that displays the graphic user interface 302. The graphic user interface 302 displays authentication information for the item 104, such as the authenticator 304 field, the description 306 field, the unique identifier for the memorabilia item 308 field, and the authentication time 310 field. In this example, the authentication information displayed in the graphic user interface 302 indicates that the football used in the championship game was signed by the championship game quarterback on Feb. 4, 2007, and that the football has a RFID tag with the unique identifier 987654321.

The graphic user interface 302 also displays sales information for the item 104, such as sales information listed under the previous sellers 312 column, the previous buyers 314 column, the sale times 316 column, the sale locations 318 column, and the sale prices 320 column. In this example, the first row of sales information displayed in the graphic user interface 302 indicates that the football was first sold by the first seller to the first buyer for $50,000 on Feb. 4, 2007, with the sale taking place in Miami, Fla. The second row of sales information also indicates that the football was sold a second time by the second seller to the second buyer for $100,000 on 1 Apr. 2007, with the sale taking place in Dallas, Tex. The graphic user interface 302 has additional rows for entering subsequent sales under the columns for previous sellers 312, previous buyers 314, sale times 316, sale locations 318, and sale prices 320. The graphic user interface 302 can be used by prospective purchasers to track the chain of title to better authenticate the item, such as confirming that the first buyer is the second seller. The graphic user interface 302 may also be used by the current seller to sell a memorabilia item to the current buyer and to transfer ownership of the memorabilia item from the current seller to the current buyer. For example, by entering acceptance of the current sales price into the graphic user interface 302, the current buyer begins an electronic funds transfer to the current seller, title to the memorabilia item is transferred to the current buyer, and provisions may be initiated to ship the memorabilia item from the current seller to the current buyer.

The graphic user interface 302 can also include a view video of authentication 322 request. For example, a collector can activate the 322 request to view a recording taken by the camera 110 of the quarterback signing the football.

Figure 4:
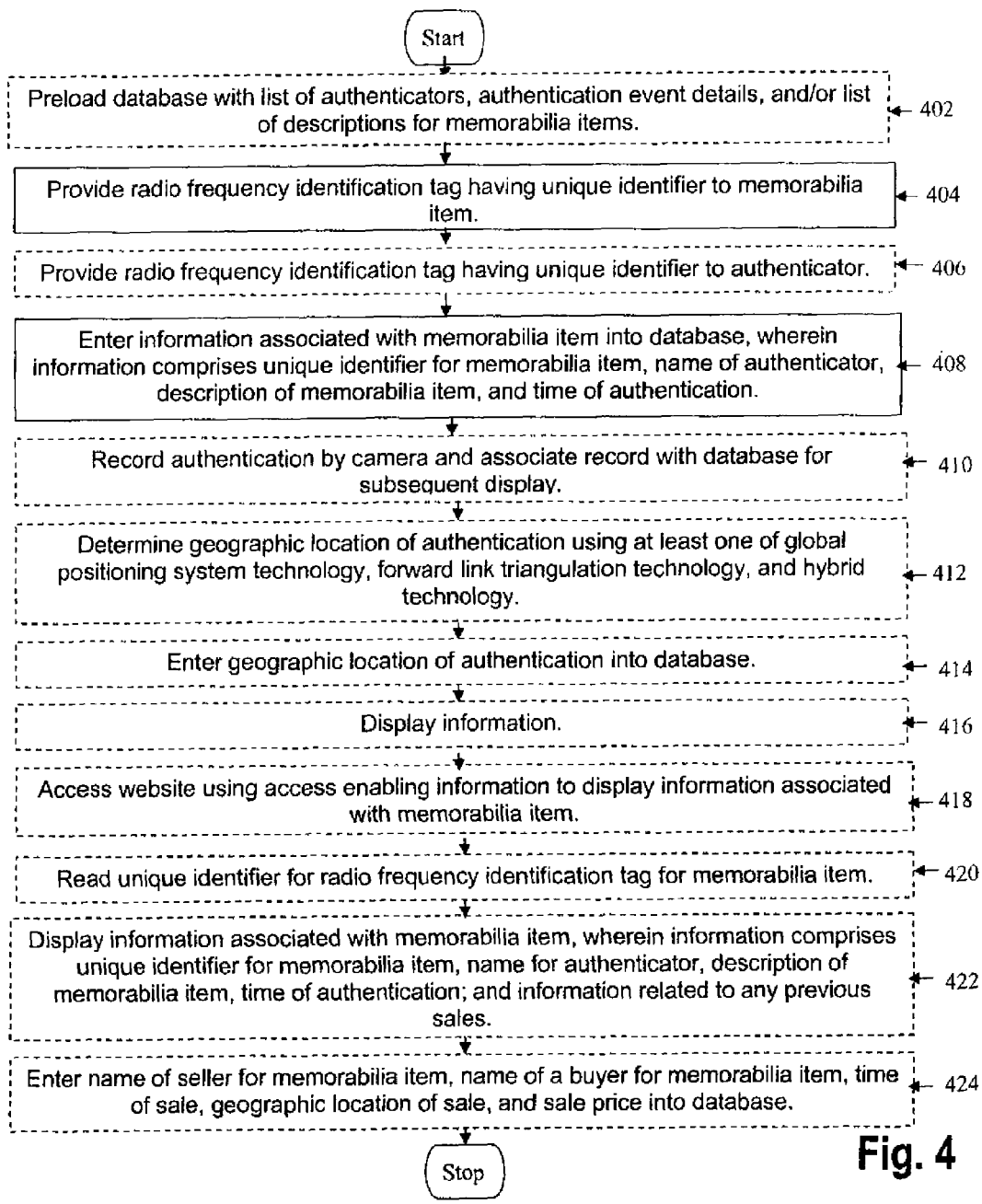
FIG. 4 shows a flowchart of a method for radio frequency identification authentication of memorabilia according to some embodiments of the present disclosure.

FIG. 4 is a flowchart illustrating a method for RFID authentication of memorabilia according to some embodiments of the present disclosure. The method can be used to authenticate, enter information, and display information for memorabilia items.

In box 402, the database is optionally preloaded with a list of authenticators and/or a list of descriptions for memorabilia items. For example, the database 202 is preloaded with a list of football players and a list of football equipment descriptions, as shown in FIG. 2, and authentication event details, such as the location, date, and time of the authentication event.

In box 404, the RFID tag having a unique identifier is provided to the memorabilia item. For example, the tag 102 can be embedded in the item 104, such as inserting the tag 102 under the surface of a football, or the tag 102 can be attached to the item 104, such as gluing the tag 102 to a photograph. The tag 102 can be embedded in or attached to the item 104 in such a manner that the tag 102 is destroyed if an attempt is made to remove the tag 102 from the item 104.

In box 406, a RFID tag having unique identifier is optionally provided to an authenticator. For example, a pen with a RFID tag 102 is given to a quarterback, who is instructed to use the pen when autographing all memorabilia items that have RFID tags. The unique identifier for the RFID tag 102 in the quarterback's pen can also be read by the reader 106 at the signing event and entered into the database 202 as another authentication check. For example, a collector, who knows that the quarterback uses the pen 112 with a unique RFID tag to autograph memorabilia items will see the quarterback's unique identifier in the graphic user interface, such as the graphic user interface 302, which provides information for items signed by the quarterback.

In box 408, information associated with the memorabilia item is entered into the database, wherein the information includes the unique identifier for the memorabilia item, the name of authenticator, the description of memorabilia item, and the time of authentication. For example, the unique identifier for the RFID tag 102 provided to the item 104 is entered into the database 202, along with the time that the quarterback signed the football. If the database 202 was not pre-loaded with the name of the quarterback and the description of the football, this information is also entered into the database 202. Additionally, the unique identifier for the RFID tag 102 in the quarterback's pen can be entered into the database 202.

In box 410, a camera optionally records the authentication and the record may be stored to the database or elsewhere for subsequent display. For example, the camera 110 records the quarterback signing the football and electronically transmits the record of the signing via wireless communication to the database 202 for subsequent display by collectors that activate the view video of authentication 322 request.

In box 412, the reader optionally determines the geographic location of the authentication event. For example, the mobile device 114 that includes the reader 106 determines the geographic location of the football signing using a global positioning system technology, a forward link triangulation technology, or another technology. The mobile device 114 may use a global positioning system or other well known technology to determine the geographic location of the item 104 during authentication.

In box 414, the geographic location of the authentication is optionally entered into the database. For example, the geographic location of where the quarterback signed the football is entered into the database 202. A collector can use the geographic location of the authentication as additional information to authenticate the item 104. For example, if the collector views a video of the quarterback signing the football immediately after a championship game played in Miami, the collector expects the geographic location of the authentication to indicate Miami, Fla.

In box 416, information is optionally displayed. For example, the quarterback may use the computer 108 to view a display of the authentication information from the database 202 to insure that no entries contain typographical or other errors.

In box 418, a website is optionally accessed using access enabling information to display information associated with the memorabilia item. For example, the current owner of the item 104 enables a memorabilia auction website to display authentication information for the item 104 provided that potential buyers enter the appropriate memorabilia auction website password. As another option, prospective purchasers access a website without entering a password to view authentication information for the item 104. The current owner of the item 104 may be able to select the degree of access for prospective purchasers to the authentication information for the item 104.

In box 420, the unique identifier for the RFID tag for the item is optionally read. For example, a collector at an auction uses the reader 106 in the collector's mobile device 114 to read the unique identifier for the RFID tag 102 in the item 104. The collector can use the unique identifier to authenticate the item 104.

In box 422, information associated with the memorabilia item is optionally displayed, wherein the information comprises the unique identifier for the memorabilia item, the name for the authenticator, the description of the memorabilia item, the time of the authentication, and information related to any previous sales. For example, after reading the unique identifier of the item 104 at the auction, the collector enters the unique identifier into a website to view the authentication information and the sales information displayed by the graphic user interface 302.

In box 424, the name of the seller for the memorabilia item, the name of the buyer for the memorabilia item, the time of the sale, the geographic location of the sale, and the sale price are optionally entered into the database. For example, after the collector authenticates the item 104 using the reader 106 in his mobile device 114, the collector agrees to the owner's sales price. Using access enabling information, the owner enters sales information into the database 202 via a website, including the names of the seller and the buyer, the time and place of the sale, and the sale price of the item.

Figure 5:
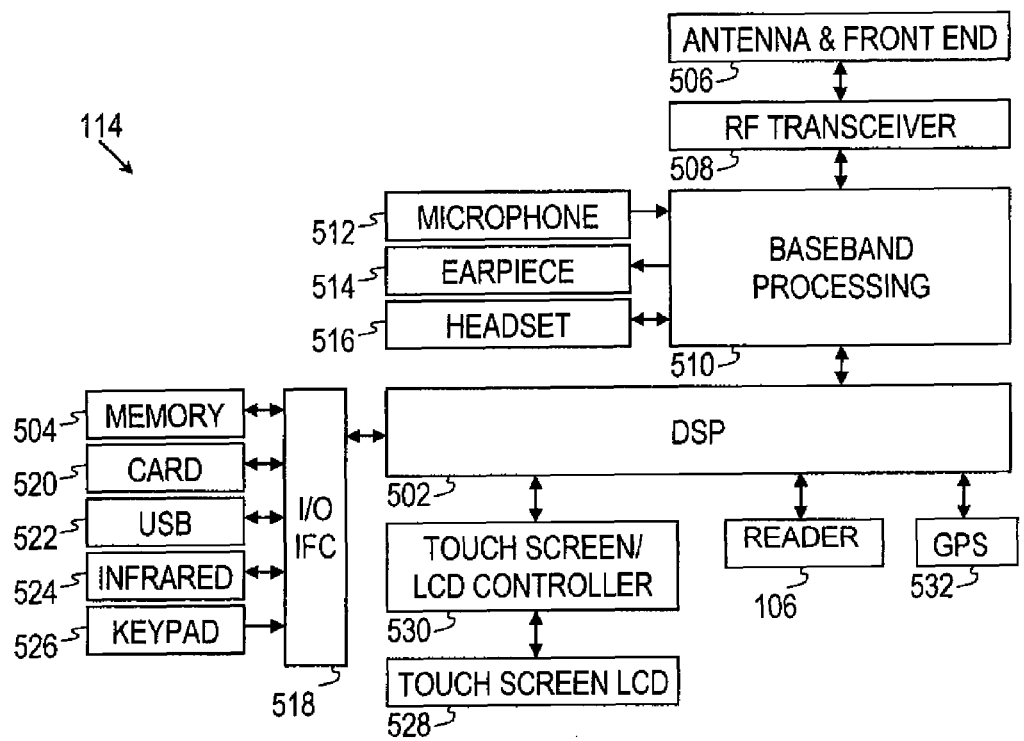
FIG. 5 shows a block diagram of an illustrative mobile device.

FIG. 5 shows a block diagram of the mobile device 114. The mobile device 114 includes a digital signal processor (DSP) 502 and a memory 504. As shown, the mobile device 114 may further include an antenna and front end unit 506, a radio frequency (RF) transceiver 508, a baseband processing unit 510, a microphone 512, an earpiece speaker 514, a headset port 516, an input/output interface 518, a memory card 520, a universal serial bus (USB) port 522, an infrared port 524, a keypad 526, a liquid crystal display (LCD) with a touch sensitive surface 528, a touch screen/LCD controller 530, a global positioning system (GPS) sensor 532, and a RFID reader 106. Some other type of display may be substituted for the LCD with the touch sensitive surface 528.

The DSP 502 or some other form of controller or central processing unit operates to control the various components of the mobile device 114 in accordance with embedded software or firmware stored in the memory 504. In addition to the embedded software or firmware, the DSP 502 may execute other applications stored in the memory 504 or made available via information carrier media such as portable data storage media like the memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502 to execute the methods for the heads up security display.

The antenna and front end unit 506 converts between wireless signals and electrical signals, enabling the mobile device 114 to send and receive information from a cellular network or some other available wireless communications network. The RF transceiver 508 may provide frequency shifting, e.g., converting received RF signals to baseband and converting baseband transmit signals to RF. The baseband processing unit 510 may provide channel equalization, decoding, and signal demodulation to extract information from received signals, and may code and modulate information to create transmit signals, and may provide filtering for signals. To that end, the baseband processing unit 510 includes ports for connecting to the built-in microphone 512 and the earpiece speaker 514 that enable the mobile device 114 to be used as a cell phone. The DSP 502 can also execute the baseband processing.

The DSP 502 can send and receive digital communications with a wireless network via the baseband processing unit 510. The input/output interface 518 interconnects the DSP 502 and various memories and interfaces. The memory 504 and the removable memory card 520 may provide software and data to configure the operation of the DSP 502. The infrared port 524 and other optional ports such as a Bluetooth interface or an IEEE 802.11 compliant wireless interface enable the mobile device 114 to communicate wirelessly with other nearby mobile devices 114 and/or wireless base stations. In some contemplated systems, the mobile device 114 is able to wirelessly exchange information at a point-of-sale when placed near a suitable transceiver.

The keypad 526 couples to the DSP 502 via the I/O interface 518 to provide one mechanism for the user to make selections, enter information, and otherwise provide input to the mobile device 114. Another input mechanism may be the touch screen display 528, which may also display text and/or graphics to the user. The display controller 530 couples the DSP 502 to the touch screen display 528.

The GPS sensor 532 is coupled to the DSP 502 to decode global positioning system signals, thereby providing at least one technology for the mobile device 114 to determine its location. Alternatively, GPS processing may be provided by a dedicated GPS chip or processor. The RFID reader 106 is an electronic tag reader that can detect RFID signals from the item's 104 RFID tag and determine the item's 104 identity based on the RFID signal. Various other peripherals may also be included to provide additional functions, e.g., radio and television reception.

Figure 6:
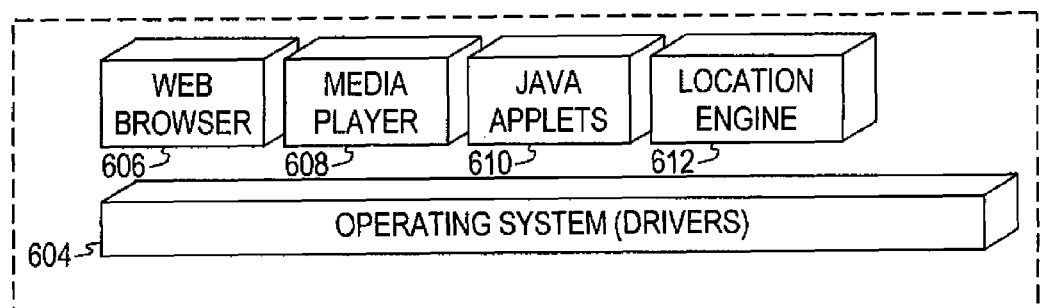
FIG. 6 shows a block diagram of an illustrative software configuration for a mobile device.

FIG. 6 illustrates a software environment 602 that may be implemented by the DSP 502. The DSP 502 executes operating system software 604 that provides a platform from which the rest of the software operates. The operating system generally provides processing resource management support. The operating system software 604 provides drivers for the mobile device hardware to make standardized interfaces available to application software. The operating system software 604 may transfer control between applications running on the mobile device 114. Also shown in FIG. 6 are a web browser 606 application, a media player 608 application, JAVA applets 610, and a location engine 612 application. The web browser 606 application configures the mobile device 114 to operate as a web browser, allowing the user to enter information into forms and select links to retrieve and view web pages, including content from the content server 126. The media player 608 application configures the mobile device 114 to retrieve and play audio or audiovisual media on its own output components. The JAVA applets 610 may configure the mobile device 114 to provide games, utilities, and other functionality on the mobile device 114. These are further examples of content that may be provided by the content server 126. The location engine 612 application can execute a location fix technology for the mobile device 114. The location engine 612 can also store item location information.

Figure 7:
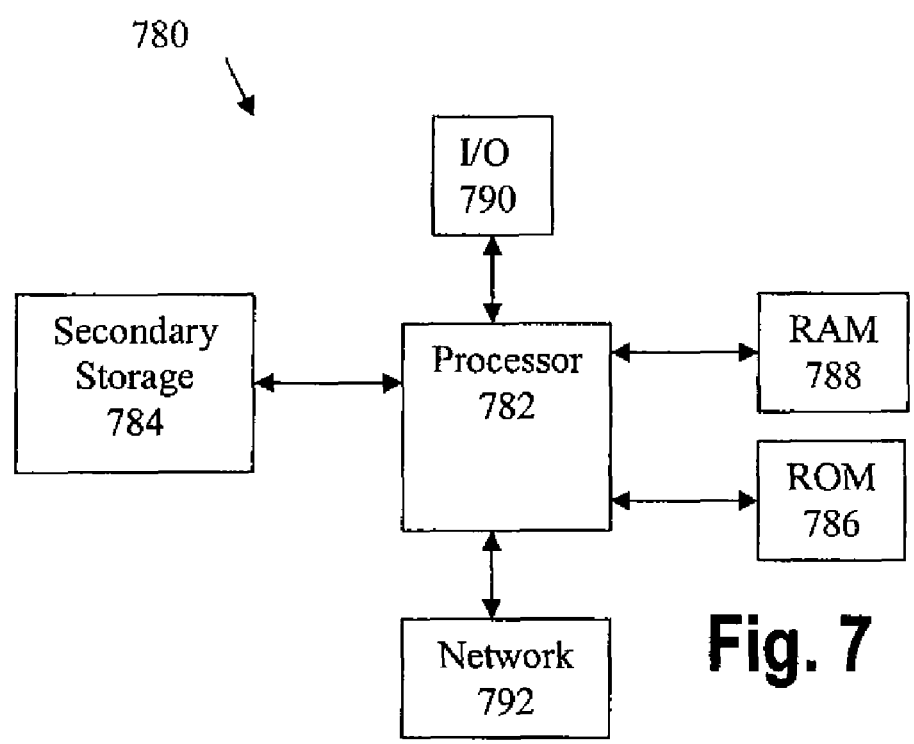
FIG. 7 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein, such as the content server 126. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for radio frequency identification authentication of memorabilia, comprising:
  a database;
  a first radio frequency identification tag provided to a memorabilia item and having a unique identifier associated with the memorabilia item;

a second radio frequency identification tag provided to an authenticator and having a unique identifier associated with the authenticator;

a reader configured to read the first radio frequency identification tag and the second radio frequency identification tag, wherein the first and second radio frequency identification tags are read contemporaneously at an authentication event where the authenticator authenticates the memorabilia item; and a user interface configured to enter information associated with the memorabilia item into the database, wherein the information comprises a description of the memorabilia item, the unique identifier associated with the memorabilia item, a description of the authenticator, the unique identifier associated with the authenticator, and a time of the authentication.

2. The system of claim 1 wherein the user interface is further configured to display the information.

3. The system of claim 1, further comprising a camera configured to record the authentication and to transmit the recording to the database for subsequent display.

4. The system of claim 1, wherein the database is pre-loaded with at least one of a list of authenticators and a list of descriptions for the memorabilia items.

5. The system of claim 1, wherein the reader is configured to determine a geographic location of the reader when the reader reads the first and second radio frequency identification tags, and the user interface is further configured to enter the geographic location into the database.

6. The system of claim 5, wherein the reader is configured to determine the geographic location of the reader using at least one of a radio frequency identification technology, a global positioning system technology, a forward link triangulation technology, and a hybrid technology.

7. The system of claim 6, wherein the reader is in a mobile phone.

8. The system of claim 1, wherein the user interface comprises at least one of a microphone, a display screen, a pointer, a keyboard, and a camera.

9. The system of claim 1, wherein the authentication comprises the authenticator autographing the memorabilia item.

10. The system of claim 1, wherein the memorabilia item is one of a piece of sports equipment, a garment, a photograph, a trading card, a program, a poster, a brochure, a media clipping, a button, a pennant, a sticker, a certificate, a document, a souvenir, a musical instrument, an autograph, a letter, a journal, a diary, an entertainment merchandise, and a motion picture memorabilia.

11. A method for radio frequency identification authentication of a memorabilia item, comprising:

providing a first radio frequency identification tag to the memorabilia item, the first radio frequency identification tag having a unique identifier associated with the memorabilia item;

providing a second radio frequency identification tag to an authenticator, the second radio frequency identification tag having a unique identifier associated with the authenticator;

contemporaneously reading, by a reader, the first and second radio frequency identification tags at an authentication event where the authenticator authenticates the memorabilia item;

determining, by the reader, a geographic location of the reader when the reader reads the first and second radio frequency identification tags; and storing information associated with the memorabilia item, the information comprising a description of the memorabilia item, the unique identifier associated with the memorabilia item, a description of the authenticator, a time of authentication, and the geographic location.

12. The method of claim 11, further comprising accessing a website using access enabling information to display information associated with the memorabilia item.

13. The method of claim 11, further comprising enabling an on-line auction to display the information associated with the memorabilia item.

14. The method of claim 11, wherein storing information associated with the memorabilia item further comprises storing information related to a sale of the memorabilia item.

15. The method of claim 14, wherein storing the information related to the sale for the memorabilia item includes storing at least one of a seller, a buyer, and a sale price for subsequent display.

16. A method for radio frequency identification authentication of memorabilia, comprising:

providing a first radio frequency identification tag to a memorabilia item, the radio frequency identification tag having a unique identifier associated with the memorabilia item;

providing a second radio frequency identification tag to an authenticator, the second radio frequency identification tag having a unique identifier associated with the authenticator;

contemporaneously reading, by a reader, the first and second radio frequency identification tags at an authentication event where the authenticator authenticates the memorabilia item;

entering information associated with the memorabilia item into a database, wherein the information comprises a description of the memorabilia item, the unique identifier associated with the memorabilia item, a description of the authenticator, the unique identifier associated with the authenticator, and a time of the authentication;

recording the authentication by a camera; and transmitting the recording to the database for subsequent display.

17. The method of claim 16, further comprising embedding the first radio frequency identification tag in the memorabilia item.

18. The method of claim 16, wherein the unique identifier associated with the authenticator is associated with a name of the authenticator.

19. The method of claim 16, further comprising requesting to display the information.

20. The method of claim 16, wherein the second radio frequency identification tag provided to the authenticator is in one of an autographing instrument and an identification card.

* * * * *